United States Patent
Joshi et al.

(10) Patent No.: US 7,805,442 B1
(45) Date of Patent: Sep. 28, 2010

(54) METHOD AND SYSTEM FOR REPRESENTATION OF GEOGRAPHICAL FEATURES IN A COMPUTER-BASED SYSTEM

(75) Inventors: Rajashri Joshi, Schaumburg, IL (US); Ole Henry Dorum, Chicago, IL (US); Vijaya Israni, Hoffman Estates, IL (US)

(73) Assignee: Navteq North America, LLC, Chicago, IL (US)

( * ) Notice: Subject to any disclaimer, the term of this patent is extended or adjusted under 35 U.S.C. 154(b) by 2118 days.

(21) Appl. No.: 09/729,939

(22) Filed: Dec. 5, 2000

(51) Int. Cl.
*G06F 7/00* (2006.01)

(52) U.S. Cl. .................. 707/736; 707/798; 707/918; 707/919; 707/920; 707/921; 701/201; 701/213; 701/214; 701/215

(58) Field of Classification Search ............. 345/419, 345/423, 606; 364/449, 459; 395/120, 133, 395/141, 142; 434/112, 116, 365; 702/27–28, 702/32, 179, 157, 150; 707/1–10, 100, 104.1, 707/736; 701/201, 213–215; *G01C 21/20, G01C 21/22; G06K 9/20*

See application file for complete search history.

(56) References Cited

U.S. PATENT DOCUMENTS

| | | | |
|---|---|---|---|
| 5,438,517 A | 8/1995 | Sennott et al. | 364/449 |
| 5,470,233 A | 11/1995 | Fruchterman et al. | 434/112 |
| 5,497,451 A | 3/1996 | Holmes | 395/120 |
| 5,566,288 A | 10/1996 | Koerhsen | 395/142 |
| 5,771,310 A * | 6/1998 | Vannah | 382/154 |
| 6,009,394 A * | 12/1999 | Bargar et al. | 704/258 |
| 6,029,173 A | 2/2000 | Meek et al. | 707/102 |
| 6,133,867 A * | 10/2000 | Eberwine et al. | 342/29 |
| 6,138,084 A | 10/2000 | Mine | |
| 6,253,164 B1 * | 6/2001 | Rohm et al. | 703/2 |
| 6,256,038 B1 * | 7/2001 | Krishnamurthy | 345/419 |
| 6,345,235 B1 * | 2/2002 | Edgecombe et al. | 702/27 |
| 6,639,592 B1 * | 10/2003 | Dayanand et al. | 345/419 |

(Continued)

FOREIGN PATENT DOCUMENTS

EP 0 394 517 B1 6/1993

(Continued)

OTHER PUBLICATIONS

U.S. Appl. No. 09/772,587, filed Jan. 30, 2001, entitled "Bowing coefficient representation of curvature of Geographic Features".

(Continued)

*Primary Examiner*—Charles Rones
*Assistant Examiner*—Mellissa M Chojnacki
(74) *Attorney, Agent, or Firm*—Jon D. Shutter; Frank J. Kozak; Lisa M. Schoedel (57) ABSTRACT

Cartographic data is represented using polynomial splines. To improve representation accuracy and reduce storage requirements, a database storing data points (shape points and nodes) is converted into a database of spline control points. The spline control points are computed by fitting a polynomial spline to the geographic features using a least squares approximation. The control points associated with each geographic feature are stored in a computer-usable database. The geographic features can be displayed by computing the spline functions using the stored control points.

37 Claims, 7 Drawing Sheets

U.S. PATENT DOCUMENTS 6,868,175 B1 * 3/2005 Yamamoto et al. .......... 382/145

FOREIGN PATENT DOCUMENTS

| EP | 0 807 803 A2 | 11/1997 |
| EP | 0919788 A1 | 6/1999 |
| WO | WO 95/32483 | 11/1995 |

OTHER PUBLICATIONS

U.S. Appl. No. 09/772,586, filed Jan. 30, 2001, entitled "Shape Comparison Using a Rotational Variation Metric and Applications Thereof".

* cited by examiner

METHOD AND SYSTEM FOR REPRESENTATION OF GEOGRAPHICAL FEATURES IN A COMPUTER-BASED SYSTEM

TECHNICAL FIELD OF THE INVENTION

The present invention relates generally to cartographic databases, and in particular, to the representation of geographic features using polynomial splines.

BACKGROUND OF THE INVENTION

Computer-based systems that display graphical maps of geographic areas use cartographic databases that contain data that represent the geographic features in the areas. The geographic features represented by data in cartographic databases may include roads, intersections, points-of-interest, lakes, railroad tracks, buildings, airports, stadiums, parks, mountain ranges, bridges, and so on. To permit these features to be displayed, a cartographic database includes data that represent the geometry (e.g., size, shape and position) and character of these various geographic features.

In order to represent roads (as well as other geographic features on a computer), it is necessary to use some form of discretization. In some cartographic databases, each road is represented in terms of one or more discrete road segments. Each road segment is represented by a separate data entity contained in the cartographic database. Thus, each road segment data entity represents a portion of a roadway in a particular geographic region.

In some cartographic databases, the geometry of each represented geographic feature is represented using one or more discrete data points wherein each data point consists of coordinate pairs (longitude, latitude) or coordinate triples (longitude, latitude, altitude). A point feature, such as a point of interest or intersection of roads, is represented using a single data point, while continuous features, such as road segments, lake boundaries, and so on, are represented as a sequence of data points. The end points of the sequence of data points used to represent a continuous geographic feature are referred to as nodes, while data points between the end points are referred to as shape points. Using nodes and shape points, the true shape of a continuous geographic feature can be approximated. The shape points and nodes can be stored in a shape point database, which may be part of a larger cartographic database.

Figure 1:
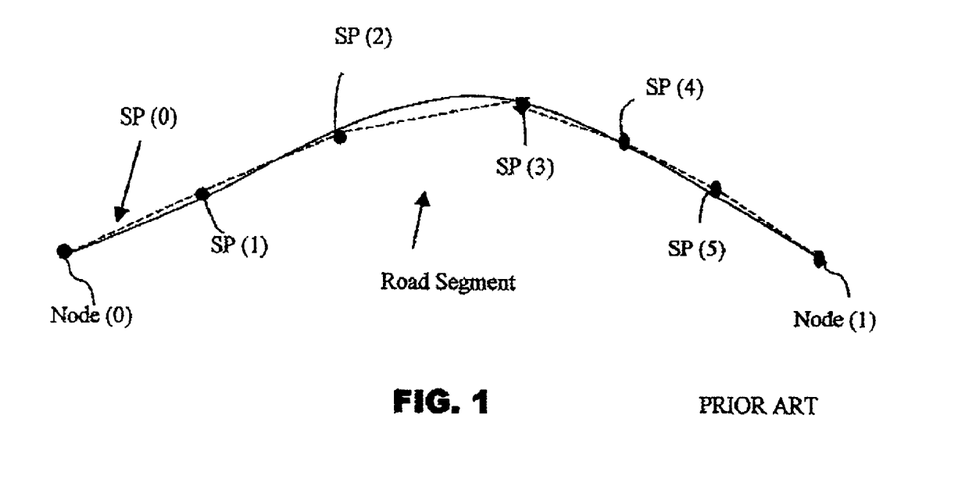
FIG. 1 depicts an exemplary geographic feature represented by shape points and nodes with piecewise linear interpolation.

To display the geographic features on a computer display device, piecewise linear interpolation is used between the shape points to draw straight lines connecting the points. This is illustrated in FIG. 1, which depicts a geographic feature (solid line) approximated by linearly interpolated lines (dashed lines) connecting shape points SP(0)-SP(5) and the nodes. With this representation scheme, the spacing between shape points is selected such that the error between the data point representation and the actual geographic feature lies within some acceptable bound.

While using data points and linear interpolation to represent the shape of geographic features has the advantage that it is conceptually relatively simple to work with in database development, compilation, access and display software, there is opportunity for improvement. For example, with linear interpolation, to achieve a high level of accuracy and detail, it is sometimes necessary to store a relatively large number of data points for a given feature. This increases the storage requirements of the cartographic database, as well as the database read time.

Accordingly, there is a need for a method and system of representing and storing geographic features, such as road geometry, that reduces the storage requirements while providing a high level of accuracy in representing the features. Further, it is desired that the increases in resolution and accuracy in the cartographic database do not negatively impact the database read time.

Another way to represent the geometry of continuous geographic features in a cartographic database is disclosed in U.S. Pat. No. 6,029,173. The '173 patent describes a navigation system having a cartographic database that stores data points and Bezier control points that represent road geometry. Although the approach disclosed in the '173 patent provides an advantage over prior methods for representing geographic features, there continues to be room for improvement.

DETAILED DESCRIPTION OF THE PRESENTLY PREFERRED EMBODIMENT(S)

The present invention provides a polynomial spline based method for representing geographic features in cartographic databases. The use of polynomial splines reduces the amount of data needed to accurately represent geographic features in cartographic databases. This results in smaller database sizes and shorter database read times, while maintaining or enhancing the accuracy with which geographic features are depicted in the database.

Figure 2:
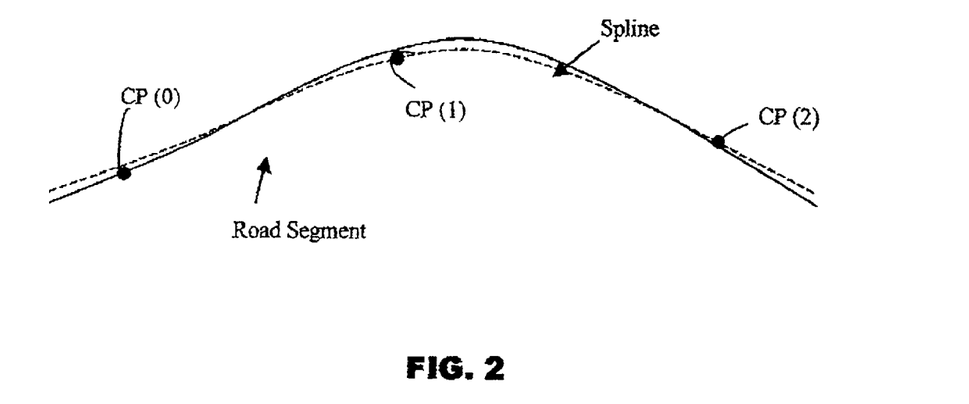
FIG. 2 depicts the geographic feature of FIG. 1 represented by a polynomial spline.

Turning now to the drawings, and in particular to FIG. 2, there is illustrated a polynomial spline representation of the geographic feature shown in FIG. 1. In FIG. 2, the spline is shown as a dashed line, while the actual geometry of the geographic feature is shown as a solid line.

A polynomial spline consists of piecewise polynomial functions which are joined end to end with some continuity condition imposed at the join points. A polynomial spline is determined completely by a set of control points CP(0)-CP(N), and in some cases, additional parameters (e.g., knots and/or control point weights).

Splines can be broadly classified as interpolating and non-interpolating. For both types of splines, the control points can be computed so that a spline accurately represents a corresponding geographic feature.

A polynomial spline refers to any composite curve formed with piecewise polynomial functions representing curve sections and satisfying specified conditions at the boundaries of the sections. There are many types of spline curves.

Figure 3:
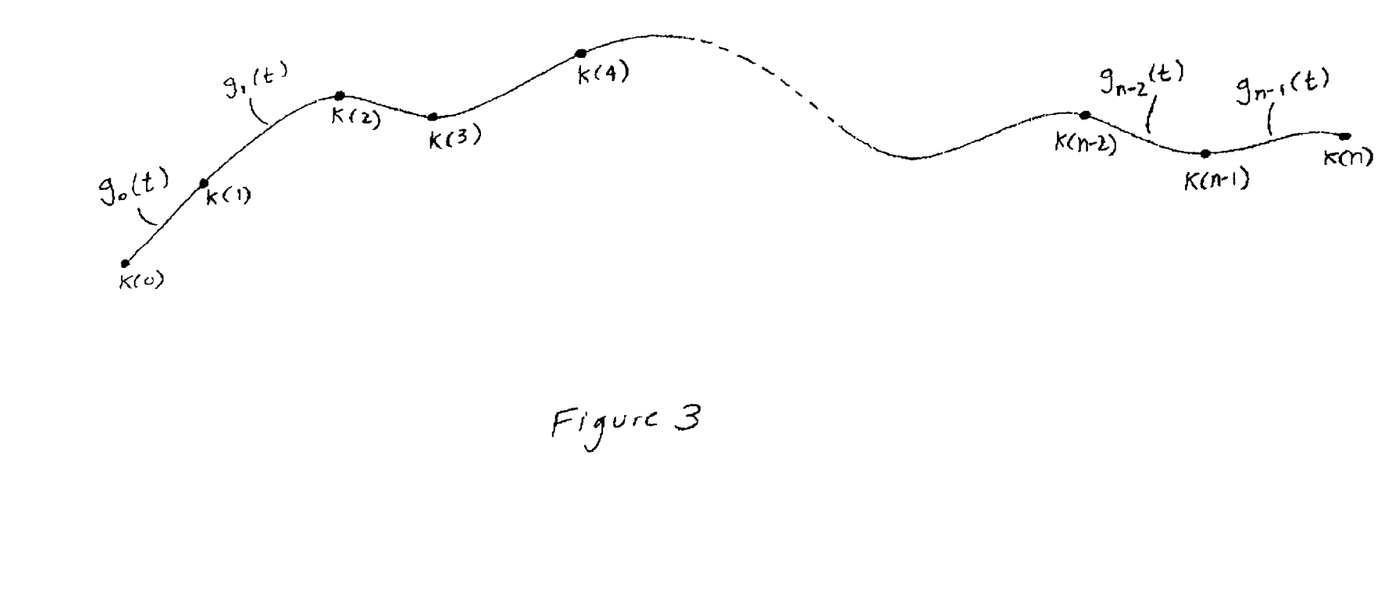
FIG. 3 depicts a parametric polynomial spline.

FIG. 3 depicts a planar parametric spline curve. The intermediate points k(0)-k(n) where the spline sections meet are known as knots. In general, to ensure that the mth derivatives of the spline are continuous at the knots, a spline of order m+1 or greater is used. When the knot spacing is uniform, the spline is said to be uniform, and conversely, when the knot spacing is non-uniform, the spline is termed as a non-uniform spline.

I. Database Conversion

Figure 4:
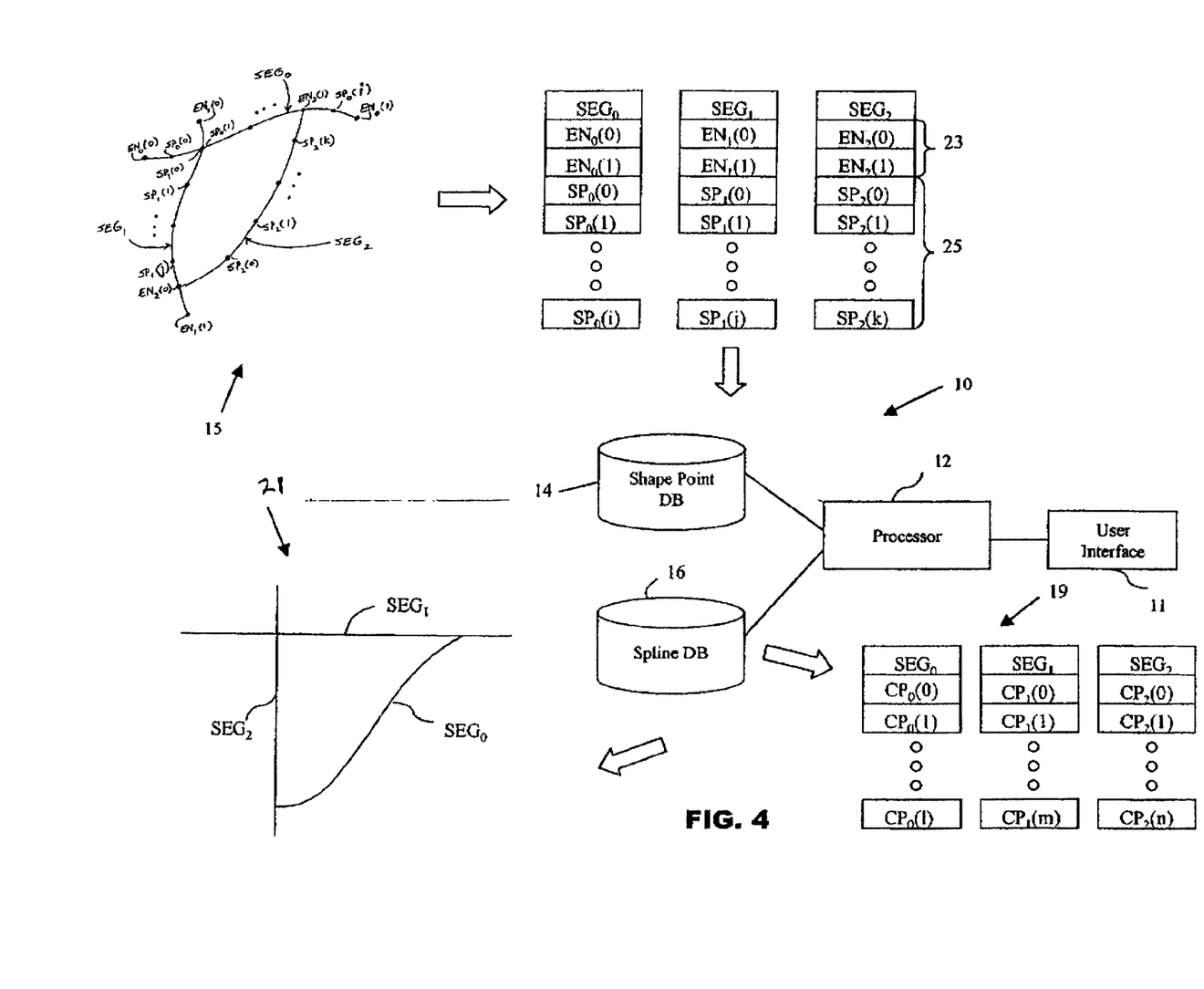
FIG. 4 is a block diagram illustrating a system for converting a shape point database into a spline database according to an embodiment of the present invention.

FIG. 4 is a block diagram of a system 10 for converting a database that represents feature geometry using shape points and nodes into a database that represents feature geometry using spline control points. The system includes a processor 12 in communication with a shape point database (DB)14 and a spline database 16. The shape point database 14 contains shape points and nodes. A user interface 11 permits users to configure conversion parameters used by the processor 12. The shape point and spline databases 14,16 can be stored on any suitable computer-usable storage medium, such as one or more CD ROMs, hard drives, DVDs, diskettes, solid-state memories such as RAMS, ROMs, or EEPROMs, or the like. As will be discussed in greater detail below, the processor 12 processes data stored in the shape point database 14 to convert it into a plurality of spline control points that are stored along with other defining parameters in the spline database 16. The spline control points can provide a more efficient representation of map data in terms of storage requirements.

The shape point database 14 stores a plurality of shape points and nodes representing one or more geographic features that can be displayed by a computer-based system, such as a navigation system, as part of a digital map. Shape points and nodes represent geographic locations within a map. In the embodiments disclosed herein, the shape points and nodes can consist of coordinate triples (longitude, latitude, altitude) or coordinate pairs (longitude, latitude), which represents specific locations along geographic features. Nodes are special cases of shape points, representing, for example, intersections between road segments and end points of geographic features. The shape points can be part of a cartographic database used for map display. The cartographic database itself may be part of a larger geographic database, which may include other kinds of databases used for functions such as route calculation, maneuver generation, and other navigational functions.

Data stored in the shape point database 14 can be organized on a per geographic feature basis, i.e., each geographic feature is represented as sequence of nodes and shape points. Although the database 14 can store a number of geographic feature entities 17, three entities $SEG_0$, $SEG_1$, $SEG_2$ are shown for illustration purposes. A pair of nodes 23 and zero or more shape point entries 25 can be associated with each entity. For entities representing straight or substantially straight geographic features, the nodes 23 are sufficient to accurately represent the feature; and therefore, for straight geographic features, the nodes alone can be stored without shape points.

In the example shown, the entities 17 correspond to geographic features (e.g., roadways) displayable on a map 15. A first geographic feature $SEG_0$ is represented by shape points $SP_0(0)$-$SP_0(i)$, where i is an integer, and nodes $EN_0(0)$-$EN_0(1)$; a second feature $SEG_1$ is represented by shape points $SP_1(0)$-$SP_1(j)$, where j is an integer, and nodes $EN_1(0)$-$EN_1(1)$; and a third feature $SEG_2$ is represented by shape points $SP_2(1)$-$SP_2(k)$, where k is an integer, and nodes $EN_2(0)$-$EN_2(1)$.

Figure 5:
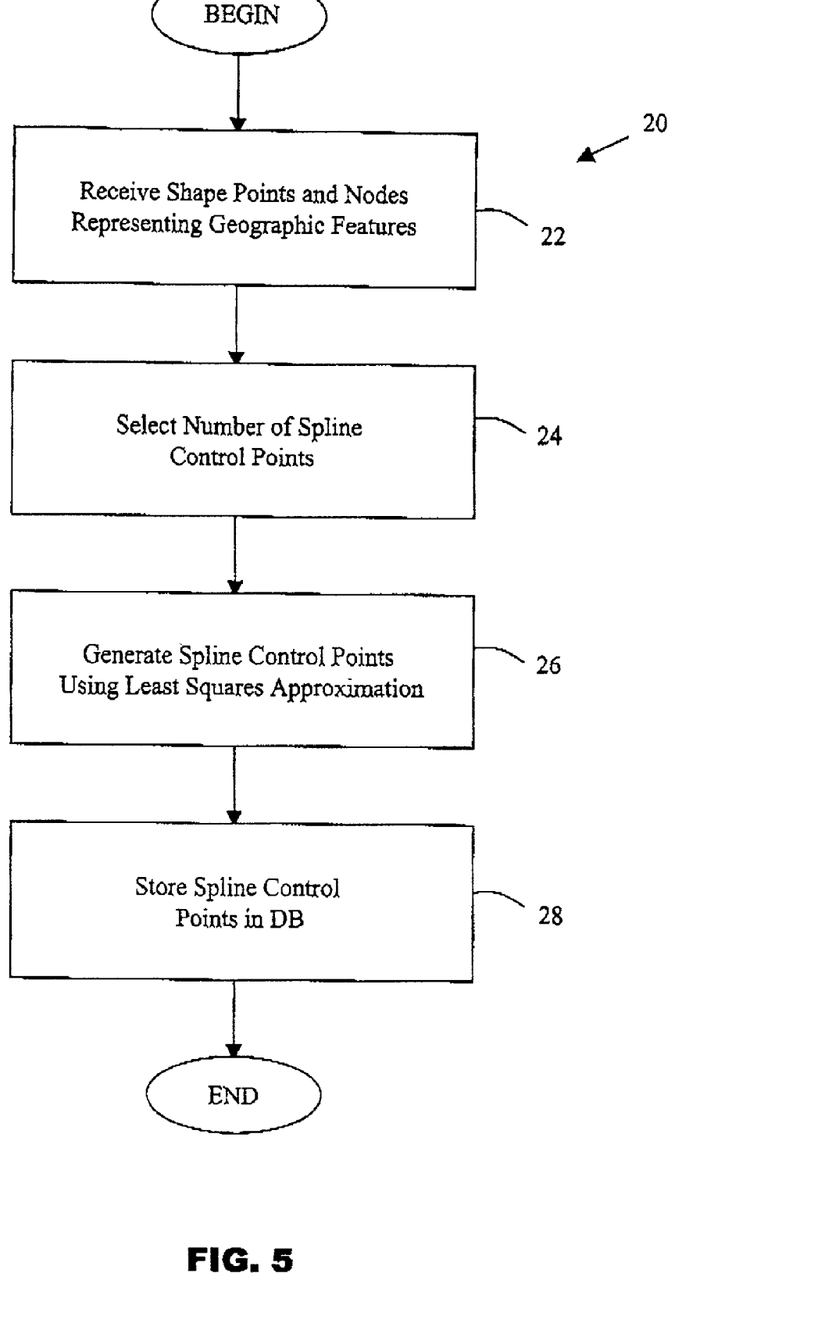
FIG. 5 is a flow chart illustrating a method of operating the processor shown in FIG. 4.

The processor 12 can be any computing device for performing the steps shown in the flow chart 20 of FIG. 5, including a conventional personal computer (PC) executing a software program. In such an embodiment, the software program can be stored on a computer-usable media for configuring the processor 12 to perform the method of FIG. 5 as disclosed herein. The computer-usable media can be any article of manufacture for storing computer programs, such as a CD ROM, hard drive, DVD, diskette, solid-state memory such as a RAM, ROM, or EEPROM, or the like. Alternatively, the processor 12 can be a custom hardware device, such as one or more application specific integrated circuits (ASIC) designed to perform according to the method shown in FIG. 5.

Generally, for each geographic feature entity in the shape point database 14, the processor 12 generates a corresponding set of control points and other parameters 19 that define the spline; these parameters are stored in the spline database 16. These control points and other parameters can be used to compute the spline function, which can represent the geographic feature in a displayable map 21.

In the example shown, the first geographic feature $SEG_0$ is represented by control points $CP_0(0)$-$CP_0(1)$, where 1 is an integer; the second geographic feature $SEG_1$ is represented by control points $CP_1(0)$-$CP_1(m)$, where m is an integer; and the third geographic feature $SEG_2$ is represented by shape points $CP_2(0)$-$CP_2(n)$, where n is an integer.

FIG. 5 shows a flow chart 20 of a method of operating the processor 12 in accordance with an embodiment of the present invention. In step 22, the processor 12 receives shape points and nodes representing one or more geographic features from the shape point database 14. The processor can include a memory (not shown) for buffering the shape points.

Next, in step 24, the number of spline control points to be generated for each segment is determined. Generally, the number of control points per segment is set to be less than the number of shape points per segment. This results in smaller database storage requirements. The number of control points per segment can be set to a predetermined value or fraction of the number of shape points, or alternatively, the number can be selected by a user or be dynamically computed on a per segment basis depending on the desired level of representational accuracy. The user interface 11 can be used to select the number of control points either globally, for all geographic features being processed, or individually for each of the geographic features. Other parameters which are dependent on the type of spline being computed are also determined, either globally or on a per geographic feature basis.

In step 26, a least squares approximating polynomial spline is fitted to each of the geographic features. The polynomial spline can be any type of spline, for example, a uniform or nonuniform nonrational B-spline, NURBS, or a uniform or nonuniform Catmull-Rom spline. The application of each of these types of splines is described in further detail below.

The spline is fit to the shape points and nodes representing each geographic feature by applying a least squares approximation to the shape points and other parameters that define the geographic feature to generate the selected number of spline control points for each segment.

As will be discussed in further detail below, regularization techniques can be employed to make the least squares approximation better conditioned. In addition, "bearing values" and selective weighting can be included in the least squares approximation to improve the continuity of spline curves between geographic features that meet at a point.

In step 28, the spline control points for the geographic features are then stored in the spline database 16 (step 28).

II. Generalized Approach to Computing Least Squares Approximating Polynomial Splines Although the present invention is not limited to any particular method of performing a least squares approximation, this section describes a least squares methodology in accordance with one embodiment of the invention. The least squares methodology described in this section can be used with any type of spline function, including uniform B-splines, non-uniform B-splines, or Catmull-Rom splines.

To fully appreciate the least squares method described herein, it is appropriate to first provide a general mathematical description of a polynomial spline and its representation in parametric form.

A polynomial spline space curve of any type can be represented in parametric form as a set of polynomial functions of an independent parameter t as follows:

$$P(t) = \lfloor P_x(t) \quad P_y(t) \quad P_z(t) \rfloor \tag{1}$$

where $$P_x(t) = \sum_{i=0}^{M-1} p_i^x N_i(t), \tag{2}$$

$$P_y(t) = \sum_{i=0}^{M-1} p_i^y N_i(t), \text{ and}$$

$$P_z(t) = \sum_{i=0}^{M-1} p_i^z N_i(t);$$

and x, y and z represent longitude, latitude and altitude, respectively. The set of functions $N_i(t)$ are called spline basis functions, and the weights $P_i^x$, $P_i^y$ and $P_i^z$ on these basis functions are the control points of the spline. The basis functions vary for different types of splines. In the case of uniform splines, e.g., uniform B-spline and uniform Catmull-Rom spline, the set of basis functions is obtained by shifting a single basis function over the length of the geographic feature. In the case of nonuniform splines, e.g., nonuniform B-splines, the set of basis functions is controlled by the knot locations. For NURBS, the most general form of B-splines, the shape of the approximating functions is controlled by the knot locations, as well as by weights. The knot locations can be selected by a user for each geographic feature via the user interface 11.

Each geographic feature is specified by a set of shape points and nodes, where each point is specified as a (longitude, latitude, altitude) coordinate triple. Accordingly, for each geographic feature there is a list of points $(x_0, y_0, z_0)$, $(x_1, y_1, z_1), \ldots, (x_{N-1}, y_{N-1}, z_{N-1})$ where the $x_i$ are the longitude values, the $y_i$ are the latitude values and the $z_i$ are the altitude values. The first and last coordinate triple, viz., $(x_0, y_0, z_0)$ and $(x_{N-1}, y_{N-1}, z_{N-1})$ are the nodes, while the coordinates between these values are shape points.

In order to obtain a polynomial representation of the shape points, it is necessary to parameterize the given shape points in terms of a parameter t. This is accomplished by assigning a value $t_i$ to each triple $(x_i, y_i, z_i)$.

Parameterization can be accomplished in a number of different ways. Parameterization schemes can be broadly classified as uniform and nonuniform. In the first case, the assigned parameter values $t_i$ are uniformly spaced, generally with $t_0=0$ and each succeeding value exceeding the previous value by some constant.

A particularly successful nonuniform parameterization method involves assigning $t_0=0$ to a first shape point and incrementing the parameter value by the distance between the first shape point and the next shape point. This is called chord length parameterization.

For each geographic feature, parameterization results in a set of parameter values $t_0, t_1, \ldots, t_{N-1}$ corresponding respectively to the latitude values $x_0, x_1, \ldots, x_{N-1}$, longitude values $y_0, y_1, \ldots, y_{N-1}$ and altitude values $z_0, z_1, \ldots, z_{N-1}$. The parameter values $t_0$ and $t_{N-1}$, correspond to the nodes and the parameter values $t_1, \ldots, t_{N-2}$ correspond to the shape points.

To reduce the error in the least squares fit polynomial spline, "bearing values" are determined for the nodes of each geographic feature. The bearing values are the first derivatives at the nodes, i.e., at $t=t_0$ and at $t=t_{N-1}$. These values indicate the direction in which the geographic feature is headed at its endpoints.

The purpose of the least square fit is to find the optimal parametric polynomial spline curves $P_x(t)$, $P_y(t)$ and $P_z(t)$ such that the mean squared error between $P_x(t)$ and the given longitude and bearing values, $P_y(t)$ and the given latitude and bearing values and $P_z(t)$ and the given altitude and bearing values at the parameter values $t_0, t_1, \ldots, t_{N-1}$ is minimal. It is preferable that the nodes of each geographic feature have a larger weight associated with them than the shape points so that the spline is forced closer to the nodes. This is important so that continuity between connected geographic features can be maintained in the spline representation.

Since the steps for determination of $P_x(t)$, $P_y(t)$ and $P_z(t)$ are identical, the least squares methodology is illustrated for $P(t)$, where $P(t)$ represents $P_x(t)$, $P_y(t)$ and $P_z(t)$. This simplifies the notation somewhat for illustrative purposes.

Accordingly, the methodology defines a function $\tau(P(t))$ as follows $$\tau(P(t)) = \sum_{j=0}^{N-1} (P(t_j) - v_j)^2 + W(P(t_0) - v_0)^2 + \tag{3}$$

$$W(P(t_{N-1}) - v_{N-1})^2 + (P'(t_0) - v'(t_0))^2 + (P'(t_{N-1}) - v'(t_{N-1}))^2$$

where W is the weight assigned to the nodes and P(t) is understood to represent $P_x(t)$, $P_y(t)$ and $P_z(t)$ and v is understood to represent x, y or z.

From Equation (3), P(t) can be expressed in terms of its control points and the basis function of the spline as follows:

$$P(t) = \sum_{i=0}^{M-1} P_i N_i(t) \tag{4}$$

Substituting Equation (4) into Equation (3), yields Equation (5) below.

$$\tau(P(t)) = \sum_{j=1}^{N-2}\left(\sum_{i=0}^{M-1} P_i N_i(t_j) - \nu_j\right)^2 + \qquad (5)$$
$$W\left(\sum_{i=0}^{M-1} P_i N_i(t_i) - \nu_0\right)^2 + W\left(\sum_{i=0}^{M-1} P_i N_i(t_i) - \nu_{N-1}\right) +$$
$$\left(\sum_{i=0}^{M-1} P_i N_i'(t_0) - \nu'(t_0)\right)^2 + \left(\sum_{i=0}^{M-1} P_i N_i'(t_{N-1}) - \nu'(t_{N-1})\right)^2$$

The least squares approximation is computed by minimizing $\tau(P(t))$ of Equation (5). However, the resulting minimization is not in general "well conditioned", i.e., in solving the system of equations represented by Equation (5), the system matrix may be close to singular. There is therefore a need to use a regularization term, which will make the problem better conditioned.

Although various forms of regularization can be used in accordance with the present invention, one embodiment of the invention employs a specialized form of Tikhonov-Miller regularization, which in general involves placing a constraint on some function of $P(t)$ and its derivatives. In particular, the third derivative of $P(t)$ can be used, though this is only one possibility. Accordingly, the regularization modifies Equation (5) as follows:

$$\tau(P(t)) = \sum_{j=1}^{N-2}\left(\sum_{i=0}^{M-1} P_i N_i(t_j) - \nu_j\right)^2 + W\left(\sum_{i=0}^{M-1} P_i N_i(t_j) - \nu_0\right)^2 + \qquad (6)$$
$$W\left(\sum_{i=0}^{M-1} P_i N_i(t_j) - \nu_{N-1}\right)^2 + \left(\sum_{i=0}^{M-1} P_i N_i'(t_0) - \nu'(t_0)\right)^2 +$$
$$\left(\sum_{i=0}^{M-1} P_i N_i'(t_{N-1}) - \nu'(t_{N-1})\right)^2 + \gamma\int_{t_0}^{t_{N-1}} (P'''(t))^2 dt$$

$$\tau(P(t)) = \sum_{j=1}^{N-2}\left(\sum_{i=0}^{M-1} P_i N_i(t_j) - \nu_j\right)^2 + W\left(\sum_{i=0}^{M-1} P_i N_i(t_j) - \nu_0\right)^2 + \qquad (7)$$
$$W\left(\sum_{i=0}^{M-1} P_i N_i(t_j) - \nu_{N-1}\right)^2 + \left(\sum_{i=0}^{M-1} P_i N_i'(t_0) - \nu'(t_0)\right)^2 +$$
$$\left(\sum_{i=0}^{M-1} P_i N_i'(t_{N-1}) - \nu'(t_{N-1})\right)^2 + \gamma\int_{t_0}^{t_{N-1}}\left(\sum_{i=0}^{M-1} P_i N_i'''(t)\right)^2 dt$$

where $\gamma$ is a constant which determines the degree of regularization added.

As stated above, the goal is to find the $P(t)$ that minimizes $\tau(P(t))$. Since $P(t)$ is a function of the control points $P_0, P_1, \ldots, P_{M-1}$, it is therefore the goal to find the set of control points $P_0, P_1, \ldots, P_{M-1}$, which minimizes $\tau(P(t))$. To accomplish this, $\tau(P(t))$ is differentiated with respect to $P_l$, and the resulting derivative is set equal to zero, as shown in Equations (8)-(9).

$$0 = \frac{d\tau(P(t))}{dP_l} = \qquad (8)$$
$$\sum_{j=1}^{N-2} 2\left(\sum_{i=0}^{M-1} P_i N_i(t_j) - \nu_j\right) N_l(t_j) + 2W\left(\sum_{i=0}^{M-1} P_i N_i(t_j) - \nu_0\right) N_l(t_j) +$$
$$2W\left(\sum_{i=0}^{M-1} P_i N_i(t_j) - \nu_{N-1}\right) N_l(t_j) + 2\left(\sum_{i=0}^{M-1} P_i N_i'(t_0) - \nu'(t_0)\right) N_l'(t_j) +$$
$$2\left(\sum_{i=0}^{M-1} P_i N_i'(t_{N-1}) - \nu'(t_{N-1})\right) N_l'(t_j) +$$
$$\gamma \int_{t_0}^{t_{N-1}} 2\left(\sum_{i=0}^{M-1} P_i N_i'''(t)\right) N_l'''(t) dt$$

or $$\sum_{i=0}^{M-1} P_i \left(\sum_{j=1}^{N-2} N_i(t_j) N_l(t_j) + W N_i(t_0) N_l(t_0) + \qquad (9)\right.$$
$$WN_i(t_{N-1})N_l(t_{N-1}) + N_i'(t_0)N_l'(t_j) + N_i'(t_{N-1})N_l'(t_j)\bigg) +$$
$$\sum_{i=0}^{M-1} P_i \left(\gamma \int_{t_0}^{t_{N-1}} N_i'''(t) N_l'''(t) dt\right) = \sum_{j=1}^{N-2} \nu_j N_l(t_j) -$$
$$W\nu_0 N_l(t_0) - W\nu_{N-1} N_l(t_{N-1}) - \nu'(t_0) N_l'(t_j) - \nu'(t_{N-1}) N_l'(t_j)$$

Equation (9) represents one row of a system of equations which is solved for the unknown coefficients $P_0, P_1, \ldots, P_{M-1}$. Differentiating $\tau(P(t))$ with respect to $P_l$, $l=0, \ldots, M-1$, and setting each result equal to zero, the full system matrix is obtained. Since the goal is to determine $P_x(t)$, $P_y(t)$ and $P_z(t)$, the following systems of equations are solved of the form of Equation (6):

$$\sum_{i=0}^{M-1} P_i^x \left(\sum_{j=1}^{N-2} N_i(t_j) N_l(t_j) + W N_i(t_0) N_l(t_0) + \qquad (10)\right.$$
$$WN_i(t_{N-1})N_l(t_{N-1}) + N_i'(t_0)N_l'(t_j) + N_i'(t_{N-1})N_l'(t_j)\bigg) +$$
$$\sum_{i=0}^{M-1} P_i^x \left(\gamma \int_{t_0}^{t_{N-1}} N_i'''(t) N_l'''(t) dt\right) = \sum_{j=1}^{N-2} x_j N_l(t_j) -$$
$$Wx_0 N_l(t_0) - Wx_{N-1} N_l(t_{N-1}) - x'(t_0) N_l'(t_j) - x'(t_{N-1}) N_l'(t_j)$$

$$\sum_{i=0}^{M-1} P_i^y \left(\sum_{j=1}^{N-2} N_i(t_j) N_l(t_j) + W N_i(t_0) N_l(t_0) + \qquad (11)\right.$$

-continued $$WN_i(t_{N-1})N_l(t_{N-1}) + N'_i(t_0)N'_l(t_j) + N'_i(t_{N-1})N'_l(t_j) \Bigg) +$$

$$\sum_{i=0}^{M-1} P_i^y \Bigg( \gamma \int_{t_0}^{t_{N-1}} N'''_i(t)N'''_l(t)\,dt \Bigg) = \sum_{j=1}^{N-2} y_j N_l(t_j) -$$

$$Wy_0 N_l(t_0) - Wy_{N-1} N_l(t_{N-1}) - y'(t_0)N'_l(t_j) - y'(t_{N-1})N'_l(t_j)$$

and $$\sum_{i=0}^{M-1} P_i^z \Bigg( \sum_{j=1}^{N-2} N_i(t_j)N_l(t_j) + WN_i(t_0)N_l(t_0) + \tag{12}$$

$$WN_i(t_{N-1})N_l(t_{N-1}) + N'_i(t_0)N'_l(t_j) + N'_i(t_{N-1})N'_l(t_j) \Bigg) +$$

$$\sum_{i=0}^{M-1} P_i^z \Bigg( \gamma \int_{t_0}^{t_{N-1}} N'''_i(t)N'''_l(t)\,dt \Bigg) = \sum_{j=1}^{N-2} z_j N_l(t_j) -$$

$$Wz_0 N_l(t_0) - Wz_{N-1} N_l(t_{N-1}) - z'(t_0)N'_l(t_j) - z'(t_{N-1})N'_l(t_j)$$

Accordingly, the polynomial spline coefficients are determined by solving Equations (10)-(12).

As described earlier, uniform or nonuniform nonrational B-splines, uniform or nonuniform Catmull-Rom splines, NURBS, and the like can be used to represent geographic features. The details specific to some of these spline types are given below.

A. Uniform Nonrational B-Spline Representation

Equations (10)-(12) are solved for the spline coefficients $P_0^x, P_1^x, \ldots, P_{M-1}^x, P_0^y, P_1^y, \ldots, P_{M-1}^y$ and $P_0^z, P_1^z, \ldots, P_{M-1}^z$. To solve these equations, the ith $4^{th}$ order uniform B-spline basis function $N_i(t)$ is substituted into Equations (10)-(12). The uniform nonrational B-spline basis function $N_i(t)$ is defined as follows:

$$N_i(t) = \begin{cases} \frac{1}{6}t^3, & i-3 \le t \le i-2 \\ -\frac{1}{2}t^3 + \frac{1}{2}t^2 + \frac{1}{2}t + \frac{1}{6}, & i-2 \le t \le i-1 \\ \frac{1}{2}t^3 - t^2 + \frac{2}{3}, & i-1 \le t \le i \\ -\frac{1}{6}t^3 + \frac{1}{2}t^2 - \frac{1}{2}t + \frac{1}{6}, & i \le t \le i+1 \\ 0 & \text{otherwise} \end{cases} \tag{13}$$

Therefore, $$N'''_i(t) = \begin{cases} 1, & i-3 \le t \le i-2 \\ -3, & i-2 \le t \le i-1 \\ 3, & i-1 \le t \le i \\ 1, & i \le t \le i+1 \\ 0 & \text{otherwise} \end{cases} \tag{14}$$

Now consider the regularization term, marked I in Equation (9)-(12). Because the third derivative of of a $4^{th}$ order polynomial is a constant, the integral I can be to computed:

$$I = \int_{t_0}^{t_{N-1}} N'''_i(t)N'''_l(t)\,dt = \int_{t_0=0}^{1} N'''_i(t)N'''_l(t)\,dt + \tag{15}$$

$$\int_1^2 N'''_i(t)N'''_l(t)\,dt + \ldots + \int_{N-2}^{t_{M-1}=N-1} N'''_i(t)N'''_l(t)\,dt$$

But $N_i'''(t)$ has support only from $i-3 \le t \le i+1$. Therefore, $$I = \int_{t_0}^{t_{N-1}} N'''_i(t)N'''_l(t)\,dt = \tag{16}$$

$$0 + \ldots + \int_{i-3}^{i-2} N'''_i(t)N'''_l(t)\,dt + \int_{i-2}^{i-1} N'''_i(t)N'''_l(t)\,dt +$$

$$\int_{i-1}^{i} N'''_i(t)N'''_l(t)\,dt + \int_{i}^{i+1} N'''_i(t)N'''_l(t)\,dt + \ldots =$$

$$\int_{i-3}^{i-2} N'''_l(t)\,dt - 3\int_{i-2}^{i-1} N'''_l(t)\,dt +$$

$$3\int_{i-1}^{i} N'''_l(t)\,dt - \int_{i}^{i+1} N'''_l(t)\,dt$$

where some of the terms may be zero, depending on the value of i. Equation (16) represents the regulation term used with the uniform B-spline.

B. Uniform Catmull-Rom Spline Representation

Like the uniform B-spline, Equations (10) and (12) are solved for the spline coefficients coefficients $P_0^x, P_1^x, \ldots, P_{M-1}^x, P_0^y, P_1^y, \ldots, P_{M-1}^y$ and $P_0^z, P_1^z, \ldots, P_{M-1}^z$. However, the ith $4^{th}$ order uniform Catmull-Rom spline basis function $N_i(t)$ is used instead of the uniform B-spline basis function. The Catmull-Rom basis function is defined as follows:

$$N_i(t) = \begin{cases} \frac{1}{2}t^3 - \frac{1}{2}t^2, & i-3 \le t \le i-2 \\ -\frac{3}{2}t^3 + 2t^2 + \frac{1}{2}t, & i-2 \le t \le i-1 \\ \frac{3}{2}t^3 - \frac{5}{2}t^2 + 1, & i-1 \le t \le i \\ -\frac{1}{2}t^3 + t^2 - \frac{1}{2}t, & i \le t \le i+1 \\ 0 & \text{otherwise} \end{cases} \tag{17}$$

Therefore, $$N'''_i(t) = \begin{cases} 3, & i-3 \le t \le i-2 \\ -9, & i-2 \le t \le i-1 \\ 9, & i-1 \le t \le i \\ -3, & i \le t \le i+1 \\ 0 & \text{otherwise} \end{cases} \tag{18}$$

The regularization term I is within a constant of the corresponding regularization term for the uniform B-spline described above. However, since the basis functions for this spline are different, the system of equations to be solved will have a different system matrix and known vector.

C. Nonuniform Nonrational B-Spline Representation

The basic set of systems to be solved is Equations (10) and (12). However, the regularization term I is not necessarily required in this case. Further, the knot values can be selected by the user.

D. NURBS

Again, the basic set of systems to be solved is Equations (10) and (12). As for nonuniform nonrational B-splines, the regularization term I may not be required in this case. Further, the knot values as well as control point weights can be selected by the user, thus affording the user greater control over the shape of the basis function and the spline.

Figure 6:
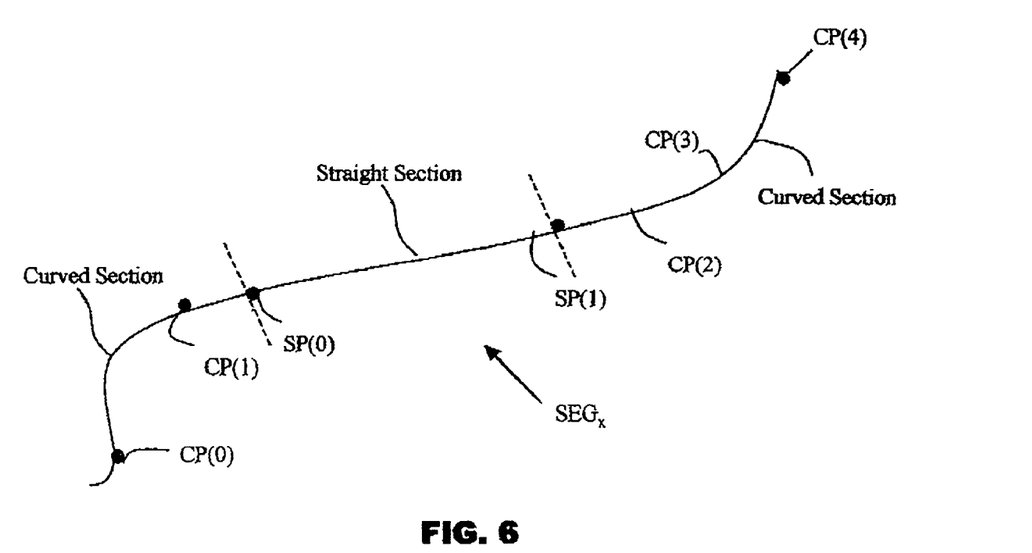
FIG. 6 depicts an exemplary geographic feature having a straight section represented by shape points and curved sections represented by spline control points.

III. Polynomial Spline with Alternative Representation for Straight Road Sections FIG. 6 depicts an exemplary geographic feature having a straight section represented by shape points and curved sections represented by a polynomial spline. For geographic features having long straight sections, the straight sections can be represented using the conventional linear interpolation method. The shape point coordinates of the endpoints of the straight section, the control points corresponding to the curved sections and other defining parameters can be stored in a single geographic feature entity in the spline database 16.

The curved sections can be represented using a best fit polynomial spline. $G^1$ Continuity is ensured at the point where the straight section and curved sections of the segment meet by incorporating this information into the least squares approximation of the curved sections of the geographic feature. Further, the degree to which this continuity is enforced can be controlled in the least squares approximation by the configurable weight factor.

The methodology to accomplish this is similar to that described above for polynomial splines, except that each geographic feature is split into sections. At points where a spline section meets a straight line section, the bearing values, i.e., first derivatives, of the two sections are incorporated into the least squares approximation. In other words, one of the bearing values in Equations (10) and (12) is replaced by the bearing value of the straight line segment. In this manner, straight sections of a geographic feature can be represented using conventional shape points and linear interpolation, while curved sections of the same feature can be represented using polynomial spline control points.

Figure 7:
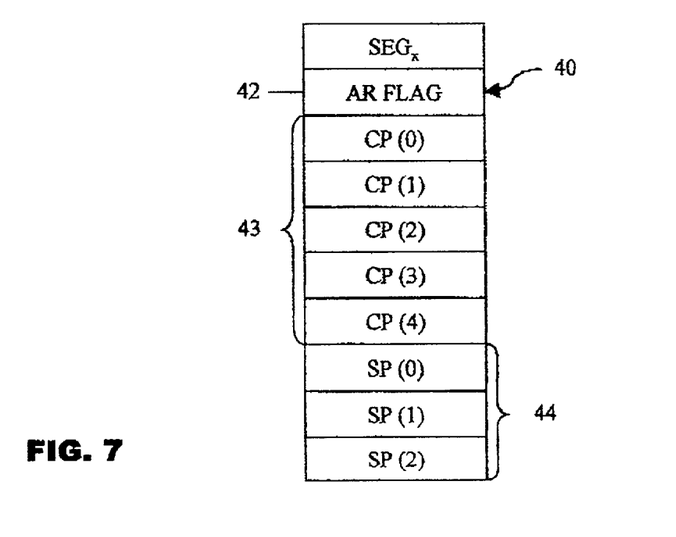
FIG. 7 shows a geographic feature data entity for storing shape points and control points representing a geographic feature having both curved and straight sections.

FIG. 7 shows an exemplary geographic feature data entity 40 for storing shape points 44, control points 43, and other defining parameters representing a geographic feature having both curved and straight sections. The data entity 40 can be stored in the spline database 16.

Included in the entity 40 is an alternative representation (AR) flag 42. The AR flag 42 can indicate to a display system reading the entity 40 that the entity 40 is represented using both control points and shape points. Accordingly, display systems can appropriately perform either linear interpolation or spline calculation using the correct entries in the entity 40.

IV. Display System for Polynomial Splines and ADASs

Figure 8:
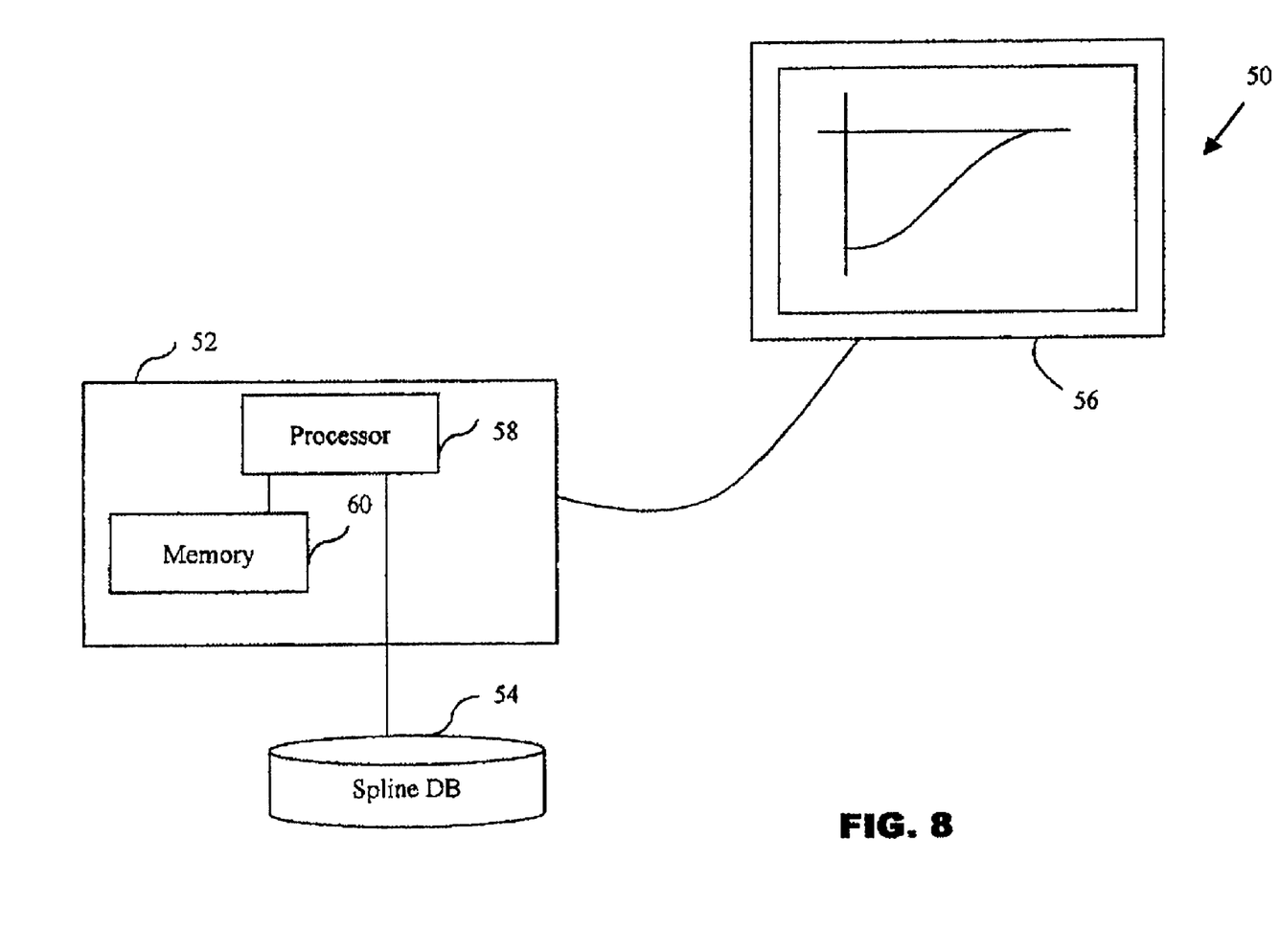
FIG. 8 is a block diagram illustrating a computer-based system capable of displaying geographic data, such as roadways represented by polynomial splines in accordance with a further embodiment of the present invention.

FIG. 8 is a block diagram illustrating a computer-based system 50 capable of displaying geographic data, such as roadways represented by polynomial splines. The system 50 includes a computer 52, a spline database (DB) 54, and an output display device 56.

The computer 52 includes a processor 58 and a memory 60. The processor 58 can execute a computer software program stored in the memory 60. The software program can direct the processor 58 to perform the steps shown in flow chart 80 of FIG. 9.

Figure 9:
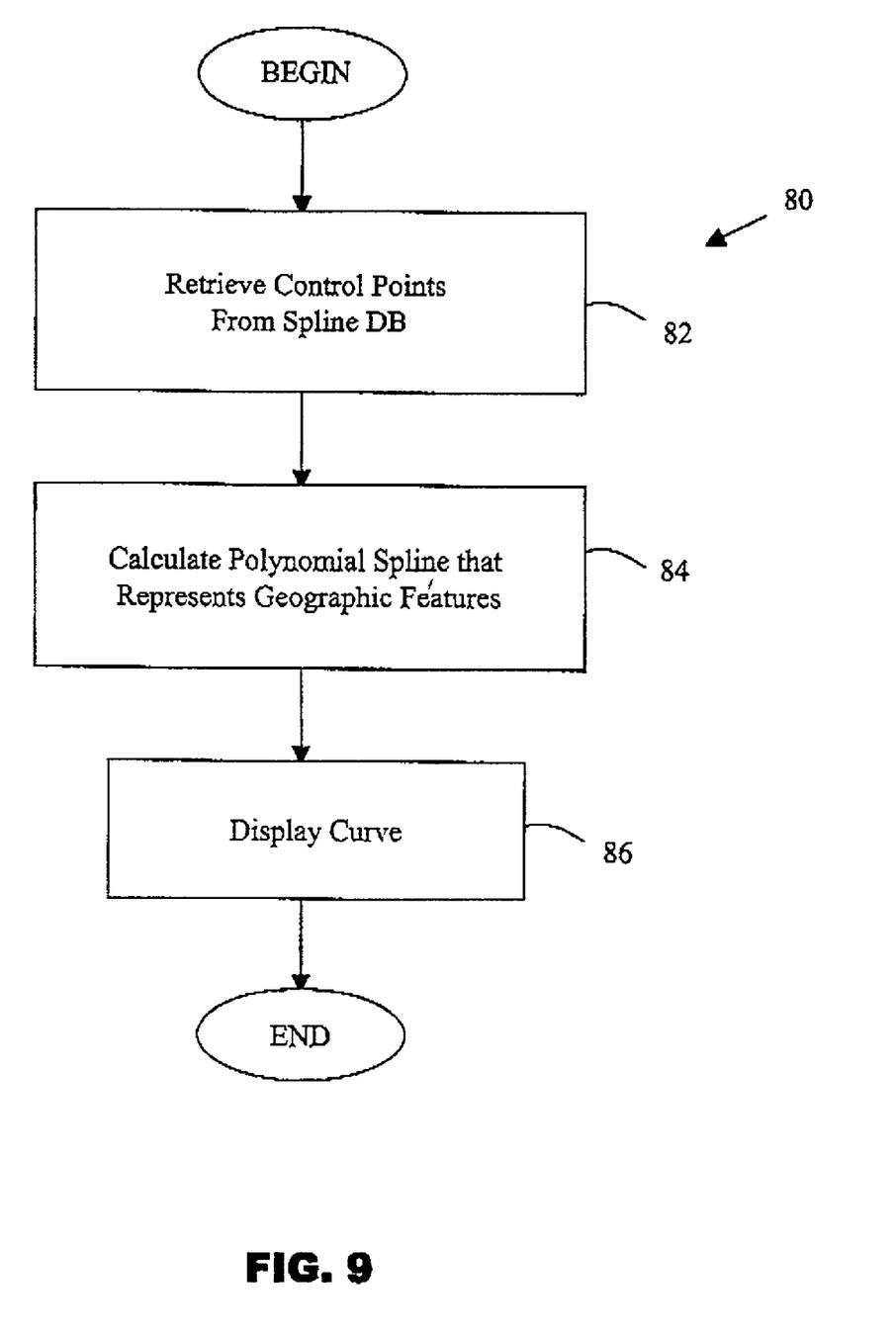
FIG. 9 is a flow chart illustrating the operation of the computer-based system shown in FIG. 8.

The flow chart 80 illustrates the operation of the computer-based system 50 shown in FIG. 8. In step 82, the processor 58 retrieves spline control points and other defining parameters from the spline database 54. Next, in step 84, the processor 58 calculates the polynomial spline representing a geographic feature. Through a conventional display interface card, the processor 58 then passes the spline information to the output display device 56, which then displays the spline representing the geographic feature to the user (step 86).

The spline database 54 can include the same data included in the spline database 16 shown in FIG. 4.

The polynomial spline calculated by the processor 58 can be any type of spline, including a uniform or nonuniform nonrational B-spline, NURBS, and a Catmull-Rom spline. In addition, the computer 52 can be configured to display geographic feature using the alternate representation technique described above for geographic feature having both straight sections and curved sections.

The computer-based system 50 of FIG. 8 can be used in navigation systems included with on-road vehicles, such as automobiles, trucks, buses, and so on, as well as advanced driver assistance systems (ADASs) provided in on-road vehicles.

Advanced driver assistance systems are capable of improving the safety, comfort, efficiency, and overall satisfaction of driving. Examples of advanced driver assistance systems include adaptive headlight aiming, adaptive cruise control, and adaptive shift control. Adaptive headlight aiming adjusts the vehicle's headlights, i.e., width, rotational angle, elevation angle, and brightness, based on the curvature of the road ahead of the vehicle, tilt, elevation change, and other factors. Adaptive cruise control allows the vehicle to maintain and/or resume a set speed or safe following distance from other vehicles at slower than the set speed based on data about vehicle speed, nearby vehicles and other obstructions, type of road traveled (motorway vs. local road), road curvature, tilt, elevation, and other factors. Adaptive shift control adjusts the gearing and shifting of automatic transmissions based on sensor data about vehicle speed, engine speed, road curvature, tilt, elevation, and other factors. There are other advanced driver assistance systems in addition to these.

These advanced driver assistance systems use a variety of sensor mechanisms in the vehicle to determine the current state of the vehicle and the current state of the roadway in front of the vehicle. These sensor mechanisms may include radar and vision-oriented sensors, such as cameras. Although radar and vision-oriented sensors are important components of ADASs, these components do not always provide a completely accurate representation of driving conditions. For example, the range and/or accuracy of radar or vision-oriented sensors can be affected by certain environmental conditions, such as fog, heavy rain or snow, or snow-covered roads. Moreover, radar and vision-oriented systems do not reliably detect certain useful road attributes, such as speed limits, traffic signs, bridge crossings, etc. Further, radar and vision-oriented sensors cannot "see" around corners or other obstructions and therefore may be limited under such circumstances.

One way to improve radar and vision-oriented systems is to use digital map data, such as road geometry information, as an additional component in ADASs. Digital map data can be used in ADASs to provide information about the road ahead. Digital map data are not affected by environmental conditions, such as fog, rain or snow. In addition, digital map data can provide useful information that cannot reliably be provided by vision-oriented systems, such as speed limits, traffic and lane restrictions, or the like.

Further, road geometry information included in the digital map data can be used to determine the road ahead of the vehicle even around corners or beyond obstructions. Accordingly, digital map data, and in particular, road geometry information, can be a useful addition in ADASs.

Representing road geometry using polynomial splines, as described herein, provides an accurate and compact way of representing such information in databases suitable for use in ADASs. These databases can improve the overall performance of ADASs by increasing the accuracy of the digitized road geometry used by the ADASs, while reducing the storage space required for the digital map information.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for representing geographic features in a computer-based system, comprising:
    providing a first computer-usable database storing a plurality of data points specifying latitude and longitude coordinates of locations along at least one geographic feature;
    fitting a polynomial spline to the at least one geographic feature by applying a least squares approximation to the data points specifying latitude and longitude coordinates to generate a plurality of control points for the polynomial spline; and
    storing the control points in a second computer-usable database, the control points being usable for representing the geometry of the at least one geographic feature in the computer-based system.

2. The method of claim 1, wherein the data points are selected from the group consisting of coordinate pairs and coordinate triples.

3. The method of claim 1, further comprising:
    configuring the number of control points.

4. The method of claim 1, wherein the polynomial spline is selected from the group consisting of uniform nonrational B-spline, non-uniform nonrational B-spline, uniform Catmull-Rom spline, nonuniform Catmull-Rom spline, and NURBS.

5. The method of claim 1, further comprising:
    defining a knot sequence for the polynomial spline.

6. The method of claim 5, further comprising:
    manually defining the knot sequence.

7. The method of claim 5, further comprising:
    storing the knot sequence in the second computer-usable database.

8. The method of claim 1, further comprising:
    incorporating in the least squares approximation a bearing value associated with a node included in the plurality of data points.

9. The method of claim 1, further comprising:
    weighting a node included in the plurality of data points in the least squares approximation.

10. The method of claim 1, further comprising:
    employing regularization in computing the least squares approximation.

11. The method of claim 1, further comprising:
    identifying a straight section of the at least one geographic feature; and
    storing in the second computer-usable database the data points corresponding to the straight section.

12. The method of claim 11, further comprising:
    computing the control points only for one or more curved sections of the at least one geographic feature.

13. The method of claim 11, further comprising:
    computing the control points such that the tangent to the spline approximation of a curved section of the at least one geographic feature and the tangent to the straight section are equal at the point at which the curved and straight section meet.

14. A method of displaying on a computer output device a function representing a geographic feature, comprising:
    retrieving from a computer-usable database a plurality of spline control points associated with the geographic feature, the spline control points being derived, using a least squares approximation, from a plurality of data points specifying latitude and longitude coordinates of locations along the geographic feature;
    calculating a polynomial spline using the spline control points to generate the function representing the geometry of the geographic feature; and
    displaying the function on the computer output device.

15. The method of claim 14, wherein the polynomial spline is selected from the group consisting of uniform nonrational B-spline, non-uniform nonrational B-spline, uniform Catmull-Rom spline, nonuniform Catmull-Rom spline, and NURBS.

16. A method of generating a computer-usable database that represents feature geometry using a plurality of spline control points associated with a plurality of geographic features, comprising:
    providing a predetermined database that represents feature geometry using a plurality of data points specifying latitude and longitude coordinates of locations along the geographic features;
    for each of the geographic features, retrieving a corresponding set of data points specifying latitude and longitude coordinates from the predetermined database;
    fitting a polynomial spline to each of the geographic features by computing a plurality of control points yielding the least squares approximation to the corresponding set of data points specifying latitude and longitude coordinates; and
    storing the plurality of spline control points in the computer-usable database.

17. The method of claim 16, further comprising:
    identifying a straight section of a geographic feature based on the data points; and
    storing in the computer-usable database the data points corresponding to the straight section of the geographic feature.

18. The method of claim 17, further comprising:
    computing the control points only for one or more curved sections of the geographic feature.

19. The method of claim 17, further comprising:
    computing the control points for a geographic feature that has a curved section and an adjoining straight section such that a bearing value at an endpoint of the curved section equals a corresponding bearing value at an endpoint of the straight section that meets the curved section.

20. The method of claim 16, further comprising:
    incorporating in the least squares approximation a bearing value associated with a node included in the plurality of data points.

21. The method of claim 16, further comprising:
weighting a node included in the plurality of data points.

22. The method of claim 16, further comprising:
employing regularization in the least squares approximation.

23. A system for displaying a function representing the geometry of a geographic feature, comprising:
- a database storing one or more spline control points associated with the geographic feature, the spline control points being derived, using a least squares approximation, from a plurality of data points specifying latitude and longitude coordinates of locations along the geographic feature;
- a processor configured to compute a polynomial spline using the spline control points to generate the function representing the geometry of the geographic feature; and
- a display device for displaying the polyline.

24. The system of claim 23, wherein the spline control points are derived by incorporating in the least squares approximation a bearing value associated with a node included in the plurality of data points.

25. The system of claim 23, wherein the spline control points are derived using the least squares approximation by weighting a node included in the plurality of data points.

26. The system of claim 23, wherein the spline control points are derived by employing regularization in the least squares approximation.

27. The system of claim 23, wherein the processor is configured to determine whether the geographic feature includes a straight section, and if so, linearly interpolate the data points representing the straight section.

28. The system of claim 23, wherein the polynomial spline is selected from the group consisting of uniform nonrational B-spline, nonuniform nonrational B-spline, uniform Catmull-Rom spline, nonuniform Catmull-Rom spline and NURBS.

29. A system for generating a plurality of spline control points that represent feature geometry, comprising:
- a fast computer-usable database for storing a plurality of data points specifying latitude and longitude coordinates of locations along at least one geographic feature;
- a processor configured to apply a least squares approximation to the data points specifying latitude and longitude coordinates to generate the plurality of control points for a polynomial spline; and
- a second computer-usable database for storing the control points.

30. The system of claim 29, wherein the processor is configured to incorporate in the least squares approximation a bearing value associated with a node included in the plurality of data points.

31. The system of claim 29, wherein the processor is configured to weight a node included in the plurality of data points in the least squares approximation.

32. The system of claim 29, wherein the processor is configured to employ regularization in computing the least squares approximation.

33. The system of claim 29, wherein the processor is configured to determine whether the at least one geographic feature has a substantially straight section, and if so, to store in the second computer-usable database the data points corresponding to the straight section.

34. The system of claim 33, wherein the processor computes the control points only for one or more curved sections of the at least one geographic feature.

35. The system of claim 29, wherein the polynomial spline is selected from the group consisting of a uniform nonrational B-spline, nonuniform nonrational B-spline uniform Catmull-Rom spline, nonuniform Catmull-Rom spline, and NURBS.

36. The method of claim 1, wherein the geographic feature is a road.

37. The method of claim 1, wherein the data points further specifying altitude.

* * * * *